United States Patent
Van Vaerenbergh et al.

(10) Patent No.: US 10,650,110 B2
(45) Date of Patent: May 12, 2020

(54) PHOTONIC CIRCUIT DESIGN SYSTEMS

(71) Applicant: HEWLETT PACKARD ENTERPRISE DEVELOPMENT LP, Houston, TX (US)

(72) Inventors: Thomas Van Vaerenbergh, Palo Alto, CA (US); Jason Pelc, Palo Alto, CA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 162 days.

(21) Appl. No.: 15/741,761

(22) PCT Filed: Jul. 8, 2015

(86) PCT No.: PCT/US2015/039543
§ 371 (c)(1),
(2) Date: Jan. 3, 2018

(87) PCT Pub. No.: WO2017/007470
PCT Pub. Date: Jan. 12, 2017

(65) Prior Publication Data
US 2018/0189425 A1 Jul. 5, 2018

(51) Int. Cl.
*G06F 17/50* (2006.01)
*G02B 6/43* (2006.01)
*G02B 6/122* (2006.01)

(52) U.S. Cl.
CPC ............ *G06F 17/505* (2013.01); *G02B 6/43* (2013.01); *G06F 17/5045* (2013.01);
(Continued)

(58) Field of Classification Search
CPC .................................................. G06F 17/505
(Continued)

(56) References Cited

U.S. PATENT DOCUMENTS 5,315,534 A * 5/1994 Schlachet ........... G06F 17/5077
716/129
5,355,322 A * 10/1994 Yamashita .......... G06F 17/5077
716/130
(Continued)

FOREIGN PATENT DOCUMENTS

CN 101990671 A 3/2011
CN 104657537 A 5/2015

OTHER PUBLICATIONS

Cone et al., Design Flow Automation for Silicon Photonics: Challenges, Collaboration, and Standardization, 2016, Springer, pp. 99-156 (Year: 2016).*

(Continued)

*Primary Examiner* — Suresh Memula
(74) *Attorney, Agent, or Firm* — Sheppard Mullin Richter & Hampton LLP (57) ABSTRACT

A photonic circuit design system includes a photonic circuit design tool to facilitate user inputs to generate a photonic circuit netlist comprising a photonic design component of a photonic circuit design. The system includes a memory system to store the photonic circuit netlist and a component library comprising a plurality of predetermined photonic design components from which the photonic design component is selected. The component library further includes physical data associated with physical characteristics of the plurality of predetermined photonic design components. The system further includes a photonic circuit generator to access the photonic circuit netlist from the memory and the associated photonic design component from the component library based on the photonic circuit netlist and to implement hierarchical algorithm associated with a physical layout and an optical interconnection of the photonic design component (Continued)

in a photonic circuit package based on the physical characteristics to generate the photonic circuit design.

20 Claims, 2 Drawing Sheets

(52) U.S. Cl.
CPC ...... *G06F 17/5068* (2013.01); *G06F 17/5072* (2013.01); *G02B 6/122* (2013.01)

(58) Field of Classification Search
USPC .......................................................... 716/103
See application file for complete search history.

(56) References Cited

U.S. PATENT DOCUMENTS

| | | | |
|---|---|---|---|
| 6,412,100 B1* | 6/2002 | Sasagawa | G06F 17/5072 703/11 |
| 7,251,386 B1* | 7/2007 | Dickinson | B82Y 20/00 385/129 |
| 7,259,031 B1 | 8/2007 | Dickinson et al. | |
| 7,392,498 B1 | 6/2008 | Srinivasan et al. | |
| 7,418,683 B1 | 8/2008 | Sonnard et al. | |
| 2003/0131323 A1 | 7/2003 | McConaghy | |
| 2005/0129348 A1 | 6/2005 | Iwasaki | |
| 2005/0289490 A1 | 12/2005 | Shastri et al. | |
| 2010/0278532 A1* | 11/2010 | Scandurra | H04B 10/803 398/45 |
| 2014/0007032 A1 | 1/2014 | Acar et al. | |
| 2014/0321802 A1* | 10/2014 | Ellis-Monaghan | G02B 6/4214 385/14 |
| 2016/0055289 A1* | 2/2016 | Cao | G06F 17/5081 716/112 |
| 2016/0171149 A1* | 6/2016 | Alloatti | G06F 17/5072 716/52 |

OTHER PUBLICATIONS

Bogaerts et al., Integrated Design for Integrated photonics: from the physical to the circuit level and back, May 2013, SPIE, pp. 1-12 (Year: 2013).*

Wang et al., Large-scale silicon photonics circuit design, Nov. 2014, SPIE pp. 1-11 (Year: 2014).*

Bogaerts et al., Silicon Photonics Circuit Design: Method, Tools and Challenges, 2018, LPR Journal, pp. 1-29 (Year: 2018).*

Chan, J., et al.; "Physical-Layer Modeling and System-Level Design of Chip-Scale Photonic Interconnection Networks"; Oct. 10, 2011; 14 pages.

Chrostowski, L., et al., "Design methodologies for silicon photonic integrated circuits"; Mar. 8, 2014; 15 pages.

Alloatti, L. et al., "A Photonics Design Tool for Advanced CMOS Nodes,", Optoelectronics, IET 9.4, Apr. 14, 2015, 11 pages, http://arxiv.org/ftp/arxiv/papers/1504/1504.03669.pdf.

International Search Report & Written Opinion received in PCT Application No. PCT/US2015/039546, dated Apr. 8, 2016, 11 pages.

Korthorst, T. et al., "Integrated Photonics Design Flow Automation," Design Kits for Multi Project Wafer Runs, Whitepaper—v1.0, PhoeniX Software, Feb. 2012, 4 pages, http://www.phoenixbv.com/appnote/Photonics_Design_Automation.pdf.

Mackenzie, P., "New Manufacturing Techniques for Optical Components Require the Power of Traditional IC Tools with Photonic Features," Design Workshop Technologies, White Paper, Jan. 17, 2002, 4 pages, http://www.designw com/pdfs/designw_doc5.pdf.

C. Condrat et al., "A Methodology for Physical Design Automation for Integrated Optics,", IEEE 55th International Midwest Symposium on Circuits and Systems (MWSCAS), 2012.

European Search Report and Search Opinion Received for EP Application No. 15897864.3, dated Nov. 12, 2018, 16 pages.

Hendry et al., "VANDAL: A Tool for the Design Specification of Nanophotonic Networks," IEEE Date, 2011, 6 pages.

* cited by examiner

PHOTONIC CIRCUIT DESIGN SYSTEMS

STATEMENT OF GOVERNMENT INTEREST

This invention was made with government support under Contract No. N66001-12-2-4007, awarded by Defense Advanced Research Projects Agency. The government has certain rights in the invention.

BACKGROUND

As the demand for high-speed computing and communication becomes more prevalent, the use of optical systems as implemented by photonic circuits is increasing. The computational performance expectations set by the information technology industry will soon require an entirely new approach to interconnect architectures and implementations, leading to an even greater demand for the use of photonic circuits. In particular, many communication applications that implement large transfers of data will require larger warehouse scale datacenters with unprecedented levels of main memory capacity interconnected by high performance fabrics with an aggregate bandwidth capability in the Exabyte per second range.

DETAILED DESCRIPTION

Photonic circuits may be fabricated in a manner similar to electronic circuits. To design a photonic circuit, layout of the photonic circuit components may be performed manually (e.g., via a "click-and-drag" type of software implementation). Such a methodology requires designers to be aware of the physical design of the photonic components at all levels of detail, and, in general, place them using a graphical interface. Such a methodology can be tedious and time-intensive, which can greatly delay fabrication of and operation of working photonic circuits. The methodology can also be very error-prone, in that the large number of components to be placed in the photonic circuit may not be guaranteed to be correct in size and position, and that it is difficult to verify correct operation of the photonic circuit. These problems become more prevalent as larger and more complicated photonic circuits are developed to meet increasing communication requirements. To this effect, a photonic circuit design system and associated algorithms can provide a more accurate and less error-prone manner of designing photonic circuits.

Figure 1:
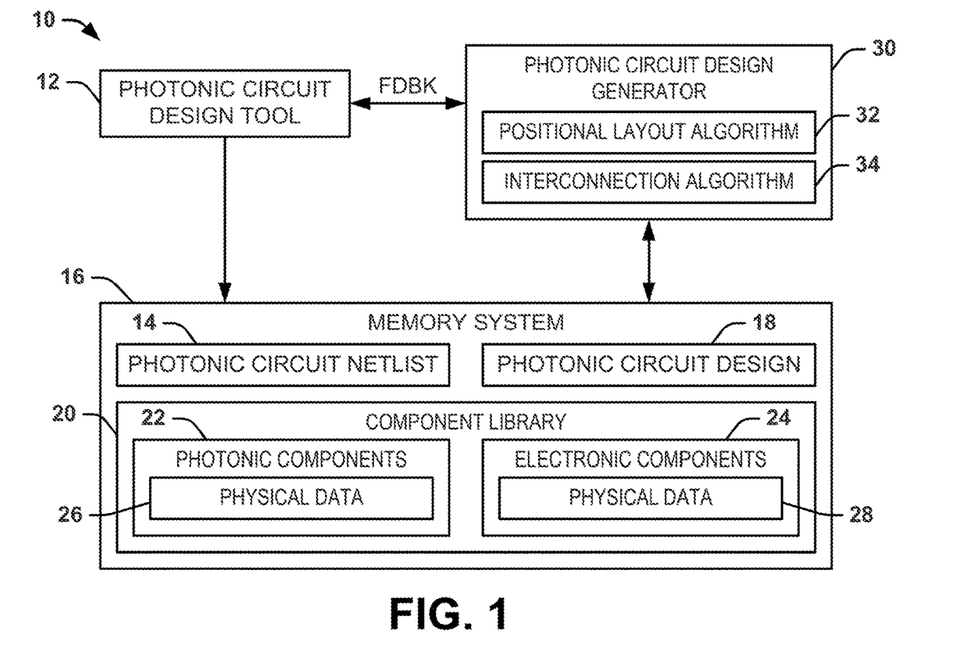
FIG. 1 illustrates an example of a photonic circuit design system.

FIG. 1 illustrates an example of a photonic circuit design system 10. The photonic circuit design system 10 can be implemented to design any of a variety of photonic circuit designs that can function in any of a variety of ways and for a variety of purposes in the field of optical communication or other optical applications. The photonic circuit design system 10 includes a photonic circuit design tool 12. The photonic circuit design tool 12 can be configured as any of a variety of types of user interfaces for receiving user inputs to design photonic circuits, such as a computer, a dedicated workstation, an Internet portal, a graphical user interface (GUI), or any of a variety of other types of user interfaces. The photonic circuit design tool 12 is thus configured to design a photonic circuit netlist 14 that can be stored in a memory system 16. As an example, the memory system 16 can be configured as a memory device or an arrangement of multiple memory devices that are configured to store data, such as in an associated computer system that includes the photonic circuit design tool 12. As described herein, the photonic circuit netlist 14 can be associated with generating a photonic circuit design 18 that can be implemented to fabricate an associated photonic circuit, such as via fabrication tools.

In the example of FIG. 1, the memory system 16 is also configured to store a component library 20. The component library 20 includes a plurality of predetermined photonic circuit components 22 and a plurality of predetermined electronic circuit components 24. As an example, the predetermined photonic circuit components 22 can include any of a variety of types of optical devices, such as gratings, reflectors, resonators, polarization components, filters, multimode interference devices, directional couplers, spiral phase-shifters, grating couplers, etc. The predetermined photonic circuit components 22 can include a variety of each type of device, such as based on variations in wavelength, polarization, or other characteristics of optical signals. As another example, the predetermined electronic circuit components 24 can include any of a variety of electronic components that are configured to interact with the predetermined photonic circuit components 22. For example, the predetermined electronic circuit components 24 can include resistors for thermal tuning, CMOS amplifiers for carrier manipulation (e.g., injection or depletion), or any of a variety of other electrical interfaces that can provide an electro-optical effect.

For example, the predetermined photonic and/or electronic circuit components 22 and 24 can have been loaded into the component library 20 via the photonic circuit design tool 12 and stored in the component library 20 for the purpose of generating the photonic circuit design 18 based on a combination of predetermined photonic and electronic circuit components 22 and 24 in the component library 20. For example, the photonic circuit design tool 12 can be implemented to design and/or define a given one of the predetermined photonic and/or electronic circuit components 22 and 24 to be stored in the component library 20 during generation of the photonic circuit design 18, as described herein, such as to meet design requirements as needed for the photonic circuit design 18.

The component library 20 is also configured to store physical data 26 associated with each respective one of the predetermined photonic circuit components 22 and physical data 28 associated with each respective one of the predetermined electronic circuit components 24. The physical data 26 and 28 can include a variety of data related to physical aspects of the respective predetermined photonic and electronic circuit components 22 and 24, such as physical dimensions; number, size, and/or orientation of ports (input and/or output); and constraints with respect to proximity and/or orientation of other respective predetermined photonic and electronic circuit components 22 and 24. Therefore, the component library 20 can store the predetermined photonic and electronic circuit components 22 and 24 as parameterized cells in the memory system 16 that include information that is pertinent to the physical layout of each respective one of the predetermined photonic and electronic circuit components 22 and 24 in an individual manner and in a collective manner.

As another example, the predetermined photonic circuit components 22 can be defined in the component library 20 as predefined low-level photonic components, such as having very basic optical functionality. As another example, the predetermined photonic circuit components 22 can be defined in the component library 20 as high-level optical device assemblies, such as comprising a plurality of the predefined low-level optical devices and/or electronic devices (e.g., predetermined electronic components 24). For example, the high-level optical device assemblies can include a variety of optical devices having a variety of more complex optical functions, such as optical logic-gates or optical modulators, that include a variety of interconnected low-level optical and/or electronic devices. Because the low-level optical devices can be included in the predetermined photonic circuit components 22 and/or the predetermined electronic circuit components 24 with defined respective physical data 26 and 28, the high-level optical devices can likewise be included in the predetermined photonic circuit components 22 and can have predefined physical data 26. As an example, the photonic circuit design tool 12 can be implemented to generate the predetermined photonic circuit components 22 as high-level optical devices, such as based on the high-level optical devices being stored in the component library 20 after having been stored as the photonic circuit design 18, as described herein. Therefore, the photonic circuit design 18 can be subsequently implemented as a portion of a larger photonic circuit design 18 (e.g., absent a photonic circuit package and with defined physical data 26).

As described previously, the photonic circuit netlist 14 is generated via the photonic circuit design tool 12. Therefore, the photonic circuit netlist 14 can include a listing of all of the photonic and electronic circuit components that are to be included in the photonic circuit design 18 to be generated, and thus the resultant photonic circuit to be fabricated.

Figure 2:
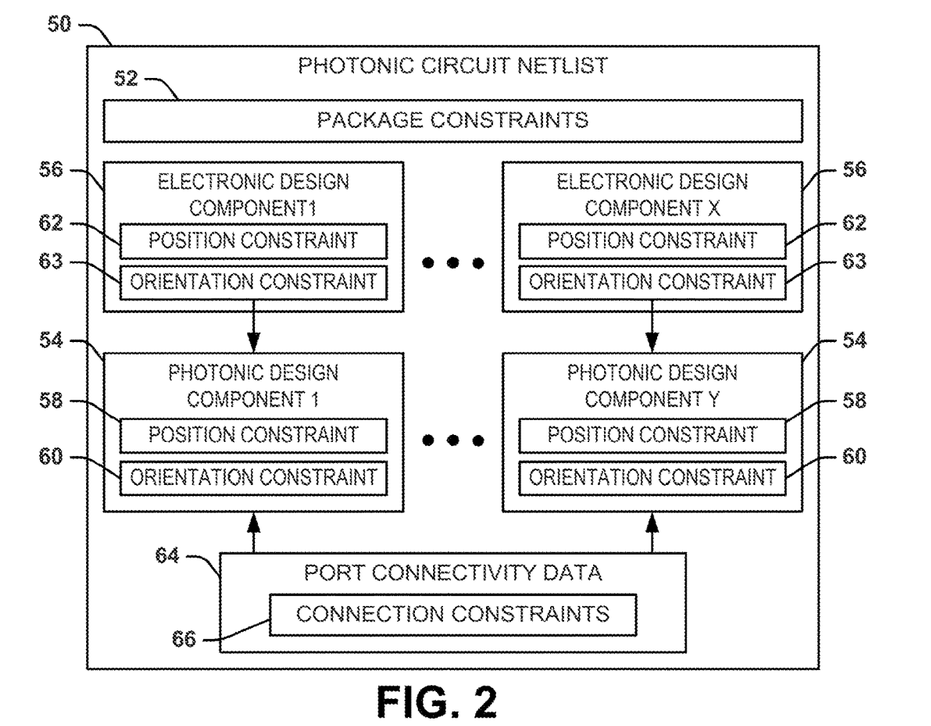
FIG. 2 illustrates an example diagram of a photonic circuit netlist.

FIG. 2 illustrates an example diagram of a photonic circuit netlist 50. The photonic circuit netlist 50 can correspond to the photonic circuit netlist 14 that is described in the example of FIG. 1. For example, the photonic circuit netlist 50 can have been generated via the photonic circuit design tool 12. Therefore, reference is to be made to the example of FIG. 1 in the following description of the example of FIG. 2.

The photonic circuit netlist 50 includes package constraints 52 that can be restrictions imposed by a designer based on the package (e.g., integrated chip) in which the resultant photonic circuit is to be fabricated. As an example, the package constraints 52 can include dimensional constraints and/or physical constraints or conditions on the physical aspects of the photonic circuit design 18. For example, the package constraints 52 can include constraints on a number and/or location of input and output ports of the photonic circuit design 18, as well as size and/or dimensional considerations of the package in which the resultant photonic circuit is to be fabricated. In addition, the package constraints 52 can include additional constraints for generating the photonic circuit design 18, such as contingencies that are responsive to design-rule-checks (DRCs) that may arise during generation of the photonic circuit design 18, as described herein.

The photonic circuit netlist 50 also includes a plurality X of photonic design components 54 and a plurality Y of electronic design components 56, where X and Y are integers that may or may not be equal. The photonic design components 54 correspond to each of the photonic components that are to be included in the photonic circuit design 18, and can be specific with respect to particular optical requirements with respect to wavelength, polarization, mode, or other optical characteristics. As an example, the photonic design components 54 can include gratings, reflectors, resonators, polarization components, filters, multimode interference devices, directional couplers, spiral phase-shifters, grating couplers, etc. In the example of FIG. 2, each of the photonic design components 54 can also include position constraints 58 and orientation constraints 60. As an example, the position constraints 58 can designate a preferred or required position of the given one of the photonic design components 54 in the resultant package of the respective photonic circuit, such as based on or in consideration of the package constraints 52 or other respective ones of the photonic design components 54 and/or the electronic design components 56. As another example, the orientation constraints 60 can designate a preferred or required orientation of the given one of the photonic design components 54 in the resultant package of the respective photonic circuit, such as to ensure proper functionality of the respective photonic device 56 (e.g., with respect to an incidence angle of an input to a grating coupler, etc.).

Similarly, the electronic design components 56 correspond to each of the electronic components that are to be included in the photonic circuit design 18, and can be specific with respect to particular electrical requirements or interaction with respect to the photonic design components 54 (e.g., with respect to setting specific amplitudes for voltage, current, and/or temperature). In the example of FIG. 2, each of the electronic design components 56 can also include position constraints 62 and/or orientation constraints 63. As an example, the position constraints 62 can designate a preferred or required position of the given one of the electronic design components 56 in the resultant package of the respective photonic circuit, such as based on or in consideration of the package constraints 52 or respective ones of the photonic design components 54. As another example, the orientation constraints 63 can designate a preferred or required orientation of the given one of the electronic design components 56 in the resultant package of the respective photonic circuit, such as to ensure proper functionality of the respective electronic device 56 (e.g., based on an association with a respective photonic device 54 having orientation constraints 60). In the example of FIG. 2, the electronic design components 56 can be associated with specific respective ones of the photonic design components 54 to provide specific functionality of the photonic design components 54 based on operation of the electronic design components 56. For example, a given electronic design component 56 can be a resistive heating element for controlling a wavelength of a respective photonic design component 54 (e.g., configured as a ring resonator). Therefore, the positional constraints 62 of the given electronic design component 56 can provide the association of the given electronic design component 56 and the respective photonic design component 54, such as to establish a desired or required proximity of the given electronic design component 56 and the respective photonic design component 54.

In addition, the photonic circuit netlist 50 includes port connectivity data 64 that is configured to designate optical and electrical interconnections of the photonic design components 54 and the electronic design components 56 in the photonic circuit design 18. For example, the port connectivity data 64 can be associated with each of the photonic design components 54, such that each of the photonic design components 54 can be expressed as a data element that provides a list of each other photonic design component 54 to which the respective photonic design component 54 is optically coupled at each port (e.g., each input port and each output port). Additionally, in the example of FIG. 2, the port connectivity data 64 includes connection constraints 66. The connection constraints 66 can designate a preferred or required position of one or more of the waveguides and/or electrical connections (e.g., vias) 54 in the resultant package of the respective photonic circuit, such as based on or in consideration of the package constraints 52, position constraints 58 and/or 62, orientation constraints 60, or positions of other respective ones of the photonic design components 54 and/or the electronic design components 56. Accordingly, the connection constraints 66 can define preferences and/or stipulations associated with the interconnection of the photonic design components 54 and/or electronic design components 56 prior to generation of the photonic circuit design 18.

Therefore, the port connectivity data 64 can define waveguide connections between each of the photonic design components 54. Additionally, the port connectivity data 64 can define optical connections from one or more of the photonic design components 54 to one or more respective input and/or output ports of the respective photonic device package, such as defined in the package constraints 52. Furthermore, in a similar manner, the port connectivity data 64 can define electrical connections between one or more of the electronic design components 56 with respect to each other, and can define electrical connections between one or more of the electronic design components 56 with respect to input and output electric signal ports of the photonic device package, such as defined in the package constraints 52.

Therefore, the photonic circuit netlist 50 can include a list of all photonic and electronic design components 54 and 56 to be included in the photonic circuit, as well as data regarding the photonic circuit package, design constraints regarding location and/or orientation of photonic and electronic design components 54 and 56 (e.g., based on the position constraints 58 and 62 and the orientation constraints 60), and data regarding the interconnection of the photonic and electronic design components 54 and 56. As an example, the photonic circuit netlist 50 can be a software element (e.g., an executable software file), such as can be generated via a variety of different types of programming code (e.g., behavioral Register Transfer Level (RTL) code, VHSIC Hardware Description Language (VHDL) code, or Verilog code). As described previously in the example of FIG. 1, the photonic circuit netlist 50 can be saved in the memory system 16 to be accessed to generate the photonic circuit design, as described in greater detail herein.

Referring back to the example of FIG. 1, the photonic circuit design system 10 includes a photonic circuit design generator 30. The photonic circuit design generator 30 can be configured as a software program, or can be implemented as or as part of one or more application specific integrated circuits (ASICs). The photonic circuit design generator 30 is configured to access the photonic circuit netlist 14 and the component library 20 to generate the photonic circuit design 18. As an example, the photonic circuit design generator 30 can access the photonic circuit netlist 14 to determine the photonic design components 54 and the electronic design components 56 that are to be included in the photonic circuit design 18. Upon determining the photonic and electronic design components 54 and 56 from the photonic circuit netlist 14, the photonic circuit design generator 30 can access the physical data 26 and 28 associated with the respective predetermined photonic and electronic design components 22 and 24 from the component library 20 that are associated with the respective photonic and electronic design components 54 and 56 in the photonic circuit netlist 14. Accordingly, the photonic circuit design generator 30 can provide a physical layout and an optical/electrical interconnection of the photonic and electronic design components 54 and 56 in the associated photonic circuit package based on the respective physical data 26 and 28 to generate the photonic circuit design 18 in a hierarchical manner.

The photonic circuit design generator 30 can, at a first hierarchy level, access the package constraints 52 to determine physical attributes of the photonic circuit package associated with the photonic circuit design 18, such as a package size (e.g., including depth, aspect ratio, and a variety of other dimensional considerations), inputs and outputs, and/or user-defined restrictions therein. Subsequently, the photonic circuit design generator 30 can step through subsequent levels of hierarchy in generating the photonic circuit design 18, with each level of hierarchy establishing positional layout and interconnection of the photonic and electronic design components 54 and 56 in the associated photonic circuit package. The photonic circuit design generator 30 can process photonic circuit netlist 14 as a whole in generating the photonic circuit design 18, such as by establishing placement and interconnection rules for the photonic and electronic design components 54 and 56 in the associated photonic circuit package.

For example, the photonic circuit design generator 30 can provide placement rules first for the photonic design components 54 in a second hierarchy level, interconnection rules for the photonic design components 54 in a third hierarchy level, layout rules for the electronic design components 56 in a fourth hierarchy level, and interconnection rules for the electronic design components 56 in a fifth hierarchy level. Accordingly, the hierarchical algorithm implemented by the photonic circuit design generator 30 can, upon establishment of all of the placement and interconnection rules, define final placement and interconnections of the photonic and electronic design components 54 and 56 in the associated photonic circuit package, as opposed to establishing placements and interconnections and only establishing DRCs at a local position of each of the photonic and electronic design components 54 and 56 (e.g., without correcting the placement of the associated photonic and electronic design components 54 and 56.

As another example, the photonic circuit design tool 12 can be implemented to design and/or define the predetermined photonic and/or electronic circuit components 22 and 24 in a hierarchical manner. For example, the photonic circuit design tool 12 can be implemented to start with a definition of a low-level predetermined photonic and/or electronic circuit components 22 and 24 (e.g., a ring-resonator, directional coupler, or other low-level device), such as via the photonic circuit design generator 30. The photonic circuit design tool 12 can then be implemented to use the defined low-level one of the predetermined photonic and/or electronic circuit components 22 and 24 to form a next-higher level device (e.g., a modulator, a photonic logic-gate, or another device) that can be defined as an additional one of the predetermined photonic and/or electronic circuit components 22 and 24, such as via the photonic circuit design generator 30. The photonic circuit design tool 12 can then be implemented to define even higher level devices, such as circuit components (e.g., lower level circuits, such as latches and flip-flops) that can be defined as an additional one of the predetermined photonic and/or electronic circuit components 22 and 24. Accordingly, the photonic circuit design tool 12 and the photonic circuit design generator 30 can be implemented to generate photonic circuit designs 18 that can form the predetermined photonic and/or electronic circuit devices 22 and 24 in a hierarchical manner.

In the example of FIG. 1, the photonic circuit design generator 30 includes a positional layout algorithm 32 that is configured to arrange the photonic design components 54 in the photonic circuit package defined by the package constraints 52 based on the position constraints 58 and/or the orientation constraints 60 defined in the photonic circuit netlist 14, and to arrange the electronic design components 56 in the photonic circuit package defined by the package constraints 52 based on the position constraints 62 and/or 63 defined in the photonic circuit netlist 14. The positional layout algorithm 32 can also provide the layout of the photonic and electronic design components 54 and 56 based on the physical data 26 and 28 relative to the package constraints 52 defined in the photonic circuit netlist 14, such as to substantially minimize a physical size of the photonic circuit associated with the photonic circuit design 18. Additionally, the positional layout algorithm 32 can provide the layout of the photonic and/or electronic design components 54 and 56 based on the port connectivity data 64 to substantially minimize the length of connections between the photonic and/or electronic design components 54 and 56. Therefore, the positional layout algorithm 32 can provide the physical layout of the photonic and electronic design components 54 and 56 in as spatially efficient a manner as possible based on the defined package constraints 52.

As an example, the positional layout algorithm 32 can implement an automated placement of the photonic and electronic design components 54 and 56 using a routine that calculates an ideal set of (X,Y,Z)-positions and orientations (e.g., based on the position constraints 58 and 62 and/or the orientation constraints 60 and/or 63), and based on the port connectivity data 64. The positional layout algorithm 32 can loop over all the optical links in the photonic circuit netlist 14 to determine optical links as tuple of two ports of two photonic design components 54. If one of those two photonic design components 54 is not yet laid out, the positional layout algorithm 32 can calculate a desired position for the photonic design component 54 based on the placement of the previous photonic design components 54. As an example, the calculation of ideal position of photonic design components 54 can be performed by using a vector match transform routine that calculates the transformation that should be performed on the to-be-placed photonic design component 54, such that the two ports can be aligned. The default distance between the two ports of the respective photonic design components 54 can be based on the minimal feature size of an associated mask fabrication technology. The positional layout algorithm 32 can also detect undesired overlap of the two photonic design components 54, and in such case, can detect a minimal translation needed to mitigate such a collision of the photonic design components 54. The positional layout algorithm 32 can likewise perform substantially similar processing for layout of the electronic design components 56 with respect to the photonic design components 54 and with respect to each other.

In the example of FIG. 1, the photonic circuit design generator 30 provides feedback FDBK to the circuit design tool 12, such as to provide feedback to the user to allow the user to make changes and/or facilitate corrections to the photonic circuit design 18. As an example, the user can provide capability to overwrite the default placement of the layout of the photonic and/or electronic design components 54 and 56, such as by specifying additional transformations that can be performed in addition to initial auto-calculated placement. For example, the user can specify changes to the position constraints 58 and 62 and/or the orientation constraints 60 and/or 63 to facilitate a change to the photonic circuit design 18 based on the feedback FDBK. For instance, the user could desire to specify that all input and/or output ports of a given one of the photonic and/or electronic design components 54 and 56 should point towards a specific direction in the package, and should be laid out as such via the positional layout algorithm 32. Accordingly, the user can provide changes to the photonic circuit design 18 based on the feedback FDBK.

In the example of FIG. 1, the photonic circuit design generator 30 also includes an interconnection algorithm 34 that is configured to interconnect the photonic design components 54 and/or the electronic design components 56 in the photonic circuit package defined by the package constraints 52 based on the port connectivity data 64 defined in the photonic circuit netlist 14. As an example, the interconnection algorithm 34 can identify the optical connectivity between respective photonic design components 54 in the photonic circuit netlist 14 based on the port connectivity data 64, and can provide waveguide connections between the ports of the respective photonic design components 54, such as to substantially minimize a physical size of the photonic circuit associated with the photonic circuit design 18. For example, the interconnection algorithm 34 can be configured to define the optical interconnections between the photonic design components 54 in three dimensions via the waveguides.

Additionally, the interconnection algorithm 34 can define an optimization threshold (e.g., adjustable via the circuit design tool 12) that can correspond to optimal package size constraints (e.g., based on the package constraints 52), such that the interconnection algorithm 34 can define intersections of the respective waveguides at orthogonal angles based on the optimization threshold. For example, if the interconnection algorithm 34 determines that repositioning of a given one or more of the photonic design components 54 to avoid a waveguide collision results in an increase in size of the photonic circuit package beyond the optimization threshold, the interconnection algorithm 34 can allow an orthogonal intersection of waveguides between the respective photonic design components 54. As an example, the interconnection algorithm 34 can implement a simple Manhattan route algorithm to calculate the most efficient way to connect two ports using only vertical and horizontal waveguide pieces, connected to each other by 90° bends. If the interconnection algorithm 34 detects that avoiding an intersection is undesirable (e.g., via the optimization threshold) or unavoidable, the interconnection algorithm 34 can note the position of the orthogonal intersections of associated waveguides and add optimized low-loss layout fixes for the orthogonal intersections.

The interconnection algorithm 34 can likewise perform substantially similar processing for layout of the electric conductors for interconnection of the electronic design components 56 with respect to electric signal ports of the photonic circuit and with respect to each other. As yet another example, the positional layout algorithm 32 and the interconnection algorithm 34 may not be implemented in order by placing both the photonic and electronic design components 54 and 56 before placing interconnections, but could instead operate in a sequence of photonic and electronic layers. For example, after arranging the placement and connectivity of the photonic layer (e.g., including both the photonic design components 54 and the associated interconnecting waveguides), the positional layout algorithm 32 can provide layout of the electronic design components 56 in an electronic layer, followed by the interconnection algorithm 34 providing associated electrical routing. As an example, the position of electrical vias can be marked based on a combination of the physical data 28, the position constraints 62, and the port connectivity data 64 to connect the vias through metal wires, such as with a pad array having a given pitch (e.g., placed at the north, south, east or west of the respective electronic design components). The interconnection algorithm 34 can also implement Manhattan routing for the electrical conductors, with an additional rerouting functionality that can avoid collision of metal wires when certain vias share the same X or Y-position. Based on the number of electrical wires, the interconnection algorithm 34 can also calculate the minimal distance needed to allow for collision free electrical wire routing between the pad array and the vias of the photonic circuit design 18.

Upon layout of the photonic and electronic design components 54 and 56 via the positional layout algorithm 32 and interconnection of the photonic and electronic design components 54 and 56 via the interconnection algorithm 34, the photonic circuit design generator 30 can save the photonic circuit design 18 in the memory system 16. Thus, the photonic circuit design 18 can be accessed or provided to fabrication tools to fabricate one or more respective photonic circuit packages based on the photonic circuit design 18. Accordingly, photonic circuits can be fabricated in a much more time-efficient manner than typical manual photonic circuit design methodologies, and can thus provide significant cost savings with respect to development and speed of design.

Furthermore, because the photonic and electronic design components 54 and 56 are selected from the predetermined photonic and/or electronic components 22 and/or 24 in the component library 20, and because the photonic circuit design generator 30 can provide the feedback FDBK during design of the photonic circuit design 18, errors in the photonic circuit design 18 can be substantially mitigated. For example, the component library 20 stores the predetermined photonic and/or electronic components 22 and/or 24 as basic building blocks of the photonic circuit design 18, with which parameter settings have previously been created and such that new instances are created only if appropriate. New definitions of the predetermined photonic and/or electronic components 22 and/or 24 can be created using a call to a "generate" function of the component library 20, which can include a look-up table for the current default settings for the creation of a new building block corresponding to one of the predetermined photonic and/or electronic components 22 and/or 24. A sweep can then be easily performed, by stepwise interfacing to the component library 20 in which default parameters can be implemented for new instances of the predetermined photonic and/or electronic components 22 and/or 24. The photonic circuit design generator 30 can automatically instantiate the predetermined photonic and/or electronic components 22 and/or 24 with the correct settings at each sweep point. As a result, the physical data 26 and/or 28 may not explicitly specify properties of the respective photonic and/or electronic components 22 and/or 24 at higher hierarchical levels. Accordingly, the need to explicitly pass the desired parameters of the photonic and/or electronic components 22 and/or 24 from the highest hierarchical level to the lowest hierarchical level can be avoided, making the definition of circuit sweeps less error-prone and requiring substantially less user code.

Figure 3:
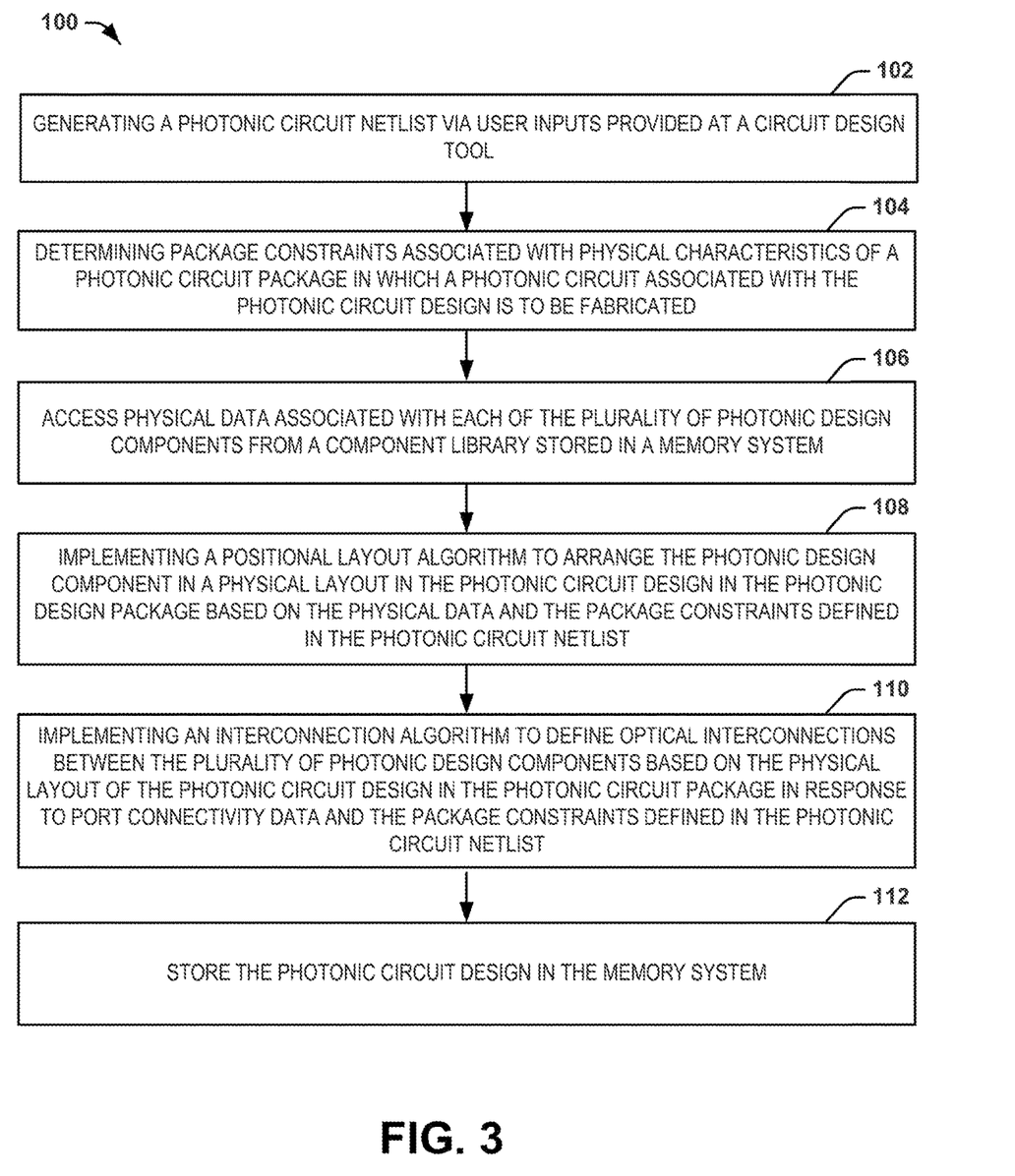
FIG. 3 illustrates an example of a method for generating a photonic circuit design.

In view of the foregoing structural and functional features described above, an example methodology will be better appreciated with reference to FIG. 3. While, for purposes of simplicity of explanation, the methodology of FIG. 3 is shown and described as executing serially, it is to be understood and appreciated that the present invention is not limited by the illustrated order, as some embodiments could in other embodiments occur in different orders and/or concurrently from that shown and described herein.

FIG. 3 illustrates an example embodiment of a method 100 for generating a photonic circuit design (e.g., the photonic circuit design 18). At 102, a photonic circuit netlist (e.g., the photonic circuit netlist 14) is generated via user inputs provided at a circuit design tool (e.g., the circuit design tool 12). The photonic circuit netlist can include a plurality of photonic design components (e.g., the photonic design components 54) associated with a photonic circuit design. At 104, package constraints (e.g., package constraints 52) associated with physical characteristics of a photonic circuit package in which a photonic circuit associated with the photonic circuit design is to be fabricated are determined. At 106, physical data (e.g., the physical data 26) associated with each of the plurality of photonic design components is accessed from a component library (e.g., the component library 20) stored in a memory system (e.g., the memory system 16). At 108, a positional layout algorithm (e.g., the positional layout algorithm 32) is implemented to arrange the photonic design component in a physical layout in the photonic circuit design in the photonic design package based on the physical data and the package constraints defined in the photonic circuit netlist. At 110, an interconnection algorithm (e.g., the interconnection algorithm 34) is implemented to define optical interconnections between the plurality of photonic design components based on the physical layout of the photonic circuit design in the photonic circuit package in response to port connectivity data (e.g., the port connectivity data 64) and the package constraints defined in the photonic circuit netlist. At 112, the photonic circuit design is stored in the memory system.

What have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A photonic circuit system comprising:
   a photonic circuit design tool to facilitate user inputs to generate a photonic circuit netlist comprising a photonic design component associated with a photonic circuit design;
   a memory system to store the photonic circuit netlist and a component library comprising a plurality of predetermined photonic design components from which the photonic design component is selected, the component library further comprising physical data associated with physical characteristics of the plurality of predetermined photonic design components; and
   a photonic circuit generator to access the photonic circuit netlist from the memory and the associate photonic design component from the component library based on the photonic circuit netlist and to implement a hierarchical algorithm associated with a physical layout and an optical interconnection of the photonic design component in a photonic circuit package based on the physical characteristics to generate the photonic circuit design,
wherein the photonic circuit generator comprises a positional layout algorithm to arrange the photonic design component based on at least one of a position constraint and an orientation constraint defined in the photonic circuit netlist to substantially minimize a physical size of a photonic circuit associated with the photonic circuit design, the positional layout algorithm further configured to calculate a desired position for an non-laid-out photonic design component based on a placement position of a previously-laid out photonic design component, and
wherein the photonic circuit design generator is configured to provide feedback to the photonic circuit design tool to allow a user to overwrite the calculated desired position of the non-laid-out photonic design component.

2. The system of claim 1, wherein the photonic circuit generator comprises an interconnection algorithm to define optical interconnections associated with the photonic design component relative to at least one of an additional photonic design component and at least one of an input port and an output port associated with the photonic circuit based on port connectivity data defined in the photonic circuit netlist to substantially minimize a physical size of a photonic circuit associated with the photonic circuit design.

3. The system of claim 2, wherein the interconnection algorithm is to define the optical interconnections in three dimensions via waveguides, and to define intersections of the waveguides at orthogonal angles based on an optimization threshold to substantially minimize the physical size of the photonic circuit associated with the photonic circuit design.

4. The system of claim 1, wherein the photonic circuit netlist comprises an electronic design component associated with the photonic circuit design, wherein the component library comprises a plurality of predetermined electronic design components from which the electronic design component is selected, the component library further comprising physical data associated with physical characteristics of the plurality of predetermined electronic design components.

5. The system of claim 4, wherein the photonic circuit generator is to access the electronic design component from the component library based on the photonic circuit netlist and to implement the hierarchical algorithm associated with the physical layout of the electronic design component relative to the photonic design component, and an electrical interconnection of the electronic design component based on the physical characteristics to generate the photonic circuit design.

6. The system of claim 1, wherein the photonic circuit design tool is further to define additional photonic design components and associated physical data that can be stored in the component library, wherein at least a portion of the additional photonic design components are arranged as high-level optical device assemblies comprising a plurality of predefined low-level optical devices.

7. The system of claim 1, wherein the photonic circuit netlist is further to define package constraints associated with physical characteristics of the photonic circuit package in which the photonic circuit associated with the photonic circuit design is to be fabricated.

8. The system of claim 1, wherein the positional layout algorithm to arrange the photonic design component based on both the position constraint and the orientation constraint defined in the photonic circuit netlist.

9. A non-transitory computer-readable medium that, when executed via a processor, is to implement a method for generating a photonic circuit design, the method comprising:
generating a photonic circuit netlist via user inputs provided at a circuit design tool, the photonic circuit netlist comprising a plurality of photonic design components associated with a photonic circuit design;
determining package constraints associated with physical characteristics of a photonic circuit package in which a photonic circuit associated with the photonic circuit design is to be fabricated;
accessing physical data associated with each of the plurality of photonic design components from a component library stored in a memory system;
implementing a positional layout algorithm to arrange the photonic design components in a physical layout in the photonic circuit design in the photonic design package based on the physical data and the package constraints defined in the photonic circuit netlist;
implementing an interconnection algorithm to define optical interconnections between the plurality of photonic design components based on the physical layout of the photonic circuit design in the photonic circuit package in response to port connectivity data and the package constraints defined in the photonic circuit netlist, wherein implementing the positional layout algorithm comprises arranging the photonic design components based on at least one of a position constraint and an orientation constraint defined in the photonic circuit netlist to substantially minimize a physical size of a photonic circuit associated with the photonic circuit design;
storing the photonic circuit design in the memory system; and
providing feedback to the circuit design tool to allow a user to overwrite the calculated desired position of the non-laid-out photonic design component.

10. The medium of claim 9, wherein implementing the interconnection algorithm comprises:
defining the optical interconnections in three dimensions via waveguides; and
defining intersections of the waveguides at orthogonal angles based on an optimization threshold to substantially minimize the physical size of a photonic circuit associated with the photonic circuit design.

11. The medium of claim 9, wherein generating the photonic circuit netlist comprises generating the photonic circuit netlist to further comprise an electronic design component, the method further comprising accessing physical data associated with the electronic design component from the component library stored in the memory system.

12. The medium of claim 11, wherein implementing the positional algorithm comprises implementing the positional layout algorithm to associate a physical layout of the electronic design component relative to the plurality of photonic design components, and wherein implementing the interconnection algorithm comprises defining an electrical interconnection of the electronic design component based on the physical characteristics to generate the photonic circuit design.

13. The medium of claim 9, the method further comprising:
receiving the photonic circuit design at the circuit design tool in a feedback manner;
facilitating the user inputs to provide a modification to the photonic circuit design via the circuit design tool; and
re-implementing at least one of the positional layout algorithm and the interconnection algorithm to generate a modified photonic circuit design based on the modification to the photonic circuit design.

14. The medium of claim 9, wherein the positional layout algorithm to arrange the photonic design component based on both the position constraint and the orientation constraint defined in the photonic circuit netlist.

15. A photonic circuit design system comprising:
a photonic circuit design tool to facilitate user inputs to generate a photonic circuit netlist comprising a plurality of photonic design component and an electronic design component associated with a photonic circuit design;
a memory system to store the photonic circuit netlist and a component library comprising a plurality of predetermined photonic design components from which the photonic design components are selected and a plurality of predetermined electronic design components from which the electronic design component is selected, the component library further comprising physical data associated with physical characteristics of the plurality of predetermined photonic design components and the plurality of predetermined electronic design components; and
a photonic circuit generator to access the photonic circuit netlist from the memory and the respective photonic and electronic design components from the component library based on the photonic circuit netlist and to implement a hierarchical algorithm associated with package constraints defined in the photonic circuit netlist and associated with physical characteristics of the photonic circuit package in which the photonic circuit associated with the photonic circuit design is to be fabricated, a physical layout of the photonic design components and the electronic design component in the photonic circuit package based on at least one of a position constraint and an orientation constraint defined in the photonic circuit netlist relative to the physical characteristics, and an interconnection algorithm of interconnections between the photonic design components in the photonic circuit package based on port connectivity data in the photonic circuit netlist to generate the photonic circuit design,
wherein the photonic circuit generator comprises a positional layout algorithm to arrange the photonic design component based on at least one of a position constraint and an orientation constraint defined in the photonic circuit netlist to substantially minimize a physical size of a photonic circuit associated with the photonic circuit design, the positional layout algorithm further configured to calculate a desired position for an non-laid-out photonic design component based on a placement position of a previously-laid out photonic design component, and
wherein the photonic circuit design generator is configured to provide feedback to the photonic circuit design tool to allow a user to overwrite the calculated desired position of the non-laid-out photonic design component.

16. The photonic circuit design system of claim 15, wherein the photonic circuit generator comprises an interconnection algorithm to define optical interconnections associated with the photonic design component relative to at least one of an additional photonic design component and at least one of an input port and an output port associated with the photonic circuit based on port connectivity data defined in the photonic circuit netlist to substantially minimize a physical size of a photonic circuit associated with the photonic circuit design.

17. The photonic circuit design system of claim 16, wherein the interconnection algorithm is to define the optical interconnections in three dimensions via waveguides, and to define intersections of the waveguides at orthogonal angles based on an optimization threshold to substantially minimize the physical size of the photonic circuit associated with the photonic circuit design.

18. The photonic circuit design system of claim 15, wherein the photonic circuit design tool is further to define additional photonic design components and associated physical data that can be stored in the component library, wherein at least a portion of the additional photonic design components are arranged as high-level optical device assemblies comprising a plurality of predefined low-level optical devices.

19. The photonic circuit design system of claim 15, wherein the photonic circuit netlist is further to define package constraints associated with physical characteristics of the photonic circuit package in which the photonic circuit associated with the photonic circuit design is to be fabricated.

20. The photonic circuit design system of claim 15, wherein the positional layout algorithm to arrange the photonic design component based on both the position constraint and the orientation constraint defined in the photonic circuit netlist.

* * * * *